Aug. 14, 1956   W. C. McFADDEN   2,758,527
FOCAL PLANE SHUTTER BRAKE
Filed Jan. 30, 1951   3 Sheets-Sheet 1
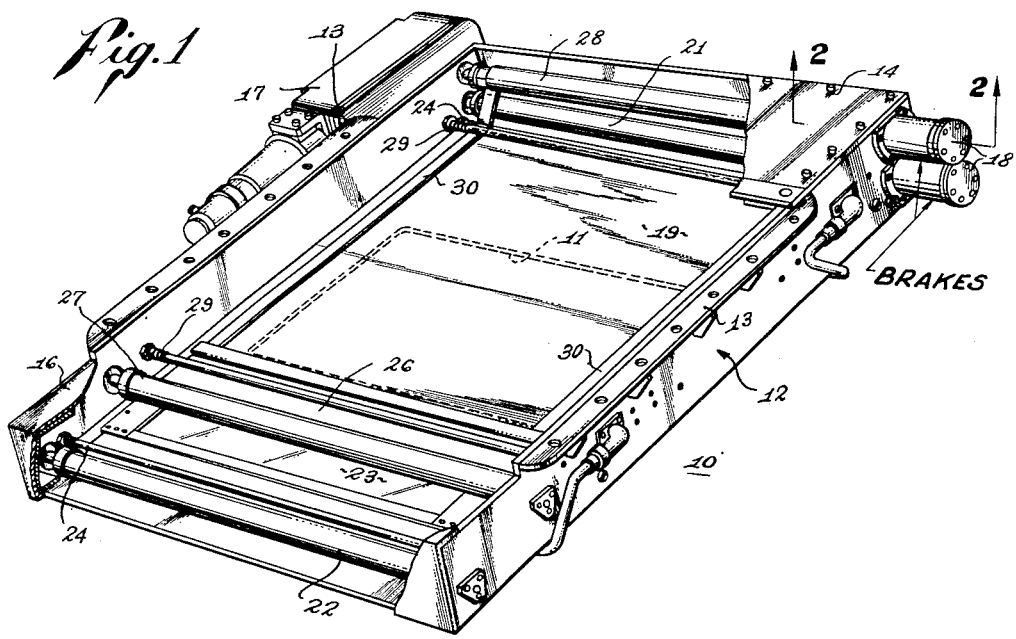
INVENTOR.
WILLIAM C. McFADDEN
BY H. W. Brelsford
Attorney

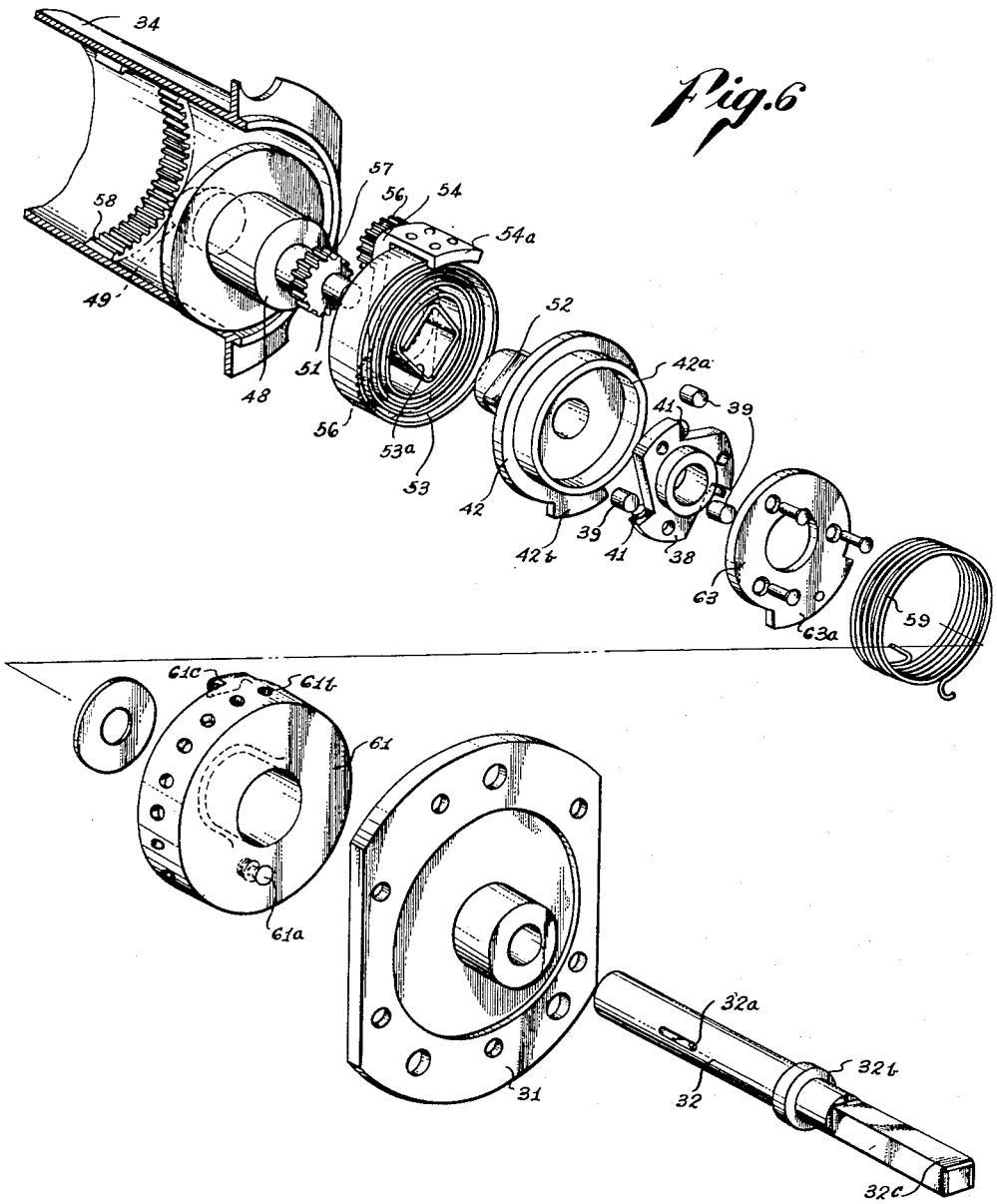

Aug. 14, 1956
W. C. McFADDEN
2,758,527
FOCAL PLANE SHUTTER BRAKE
Filed Jan. 30, 1951
3 Sheets-Sheet 3
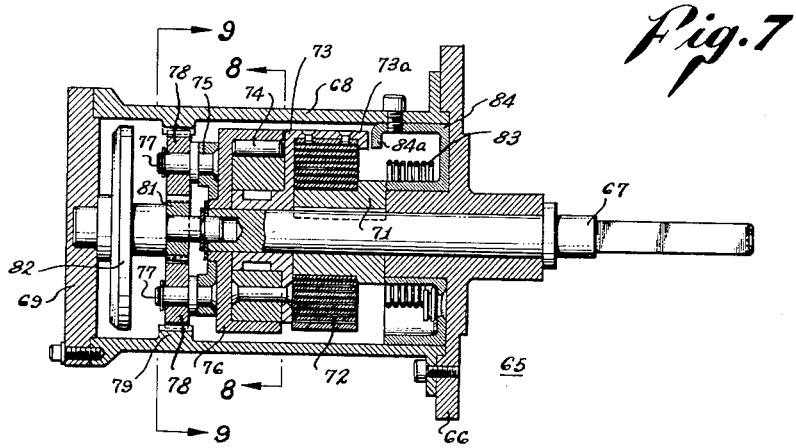
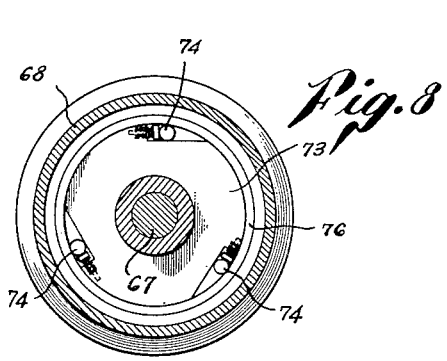
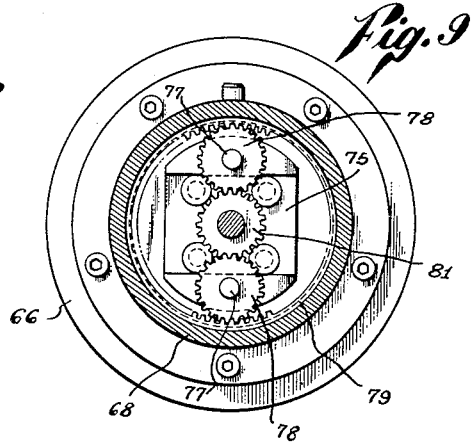
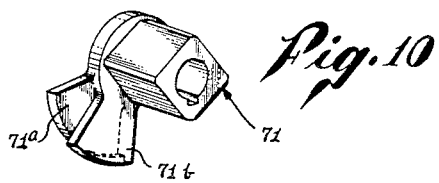
INVENTOR.
WILLIAM C. McFADDEN
BY
H. W. Brelsford
Attorney United States Patent Office 2,758,527
Patented Aug. 14, 1956

2,758,527

FOCAL PLANE SHUTTER BRAKE

William C. McFadden, La Canada, Calif., assignor to Hycon Mfg. Company, Pasadena, Calif., a corporation of Delaware Application January 30, 1951, Serial No. 208,563

6 Claims. (Cl. 95—57)

My invention relates to braking mechanisms of the inertia type and has particular reference to such a mechanism as adapted to brake the moving shutter components of cameras having focal plane shutters.

The dissipation of the energy of momentum of focal plane shutter mechanisms becomes an urgent problem in large size cameras such as those used for aerial photography. In such cameras a capping curtain is employed in addition to the shutter curtain, and both must have a regulated deceleration at the end of their stroke to insure proper operation and to reduce stresses. Each end of each curtain is mounted on a roller and the pair of rollers for any one curtain are simultaneously rotated in the same direction to transport the curtain over the exposure area of the camera.

The shutter curtain of such cameras is constructed to expose the film while moving in one direction only and accordingly must be retracted to a starting position before it is ready for the next exposure. The capping curtain is therefore provided to shield the film from light as the shutter curtain is retracted. Upon completion of the retraction of the shutter curtain, the capping curtain is withdrawn and the shutter mechanism is ready for the next exposure.

Both the capping curtain and the shutter curtain may be driven by heavy springs for operation and are withdrawn or retracted by motors. Large inertia forces build up during the operation movement, including not only the rotating inertia in each pair of rollers, but the lineal inertia of the moving curtain. If the curtains are brought suddenly to the end of their motion, the inertia forces cause heavy stresses, and the curtains flap, exposing the film. For this reason a regulated deceleration of the rolls and curtains are necessary at the end of each stroke or operation movement.

The present development wastes the energy of momentum of the curtain mechanisms by employing it to accelerate a rotatable mass. Hence the present brake may be referred to as inertia type of brake since the curtain mechanisms are slowed down and stopped by spinning a braking mass having considerable inertia.

Prior art devices have been employed to stop or arrest shutter mechanisms, but these have primarily been mechanical stops that merely determine the exact point of arrest. Thus they provide little or no braking. Friction brakes have been employed but the mechanisms used have proved too sensitive to adjustment to be reliably regulated. The present invention, by contrast, may have preselected mechanical parameters that result in positive and regular braking operation for the particular problem on hand.

It is therefore a principal object of my invention to provide a camera braking mechanism that is predictable, reliable and regulatable in its operation.

Another object is to provide an inertia brake for focal plane shutter mechanisms.

Still another object is to provide a brake actuating mechanism to apply the braking action at a preselected point in the motion cycle of a shutter mechanism.

A further object is to provide an inertia brake having a high braking effect to decelerate shutter mechanisms over a small part of the motion cycle.

Other objects and advantages will be apparent in the following description and claims considered together with the accompanying drawings forming an integral part of this specification and in which:

Fig. 1 is a perspective view with portions broken away of a focal plane shutter mechanism employing my brakes, as that shutter mechanism is viewed from the inner, or camera side;

Fig. 2 is an assembly view in full section of one of the brakes of Fig. 1, taken along the line 2—2 of Fig. 1 and illustrating also the mechanism for generating the braking impulse;

Fig. 3 is a view taken long the line 3—3 of Fig. 2;

Fig. 4 is a perspective view of a stop washer illustrated in section in Fig. 2;

Fig. 5 is a perspective view of the threaded shuttle that rides on the squared shaft of Fig. 2;

Fig. 6 is an exploded view of the various parts of the brake of Fig. 2 with the brake shell being shown in section and parts of the brake shell being removed;

Fig. 7 is a sectional view of a modified form of my brake;

Fig. 8 is a view taken along the line 8—8 of Fig. 7;

Fig. 9 is a view taken along the line 9—9 of Fig. 7; and

Fig. 10 is a perspective view of the rotatable stop engaging member also illustrated in Fig. 7 but viewed from an opposite direction from Fig. 7.

Referring to the drawings there is illustrated in Fig. 1 a complete shutter mechanism 10 adapted to be secured to the frame of a camera holding the optical parts. As viewed in Fig. 1 the light from the camera optical members comes from above and passes through an aperture 11 indicated in broken outline. A film magazine (not shown) is adapted to clamp on to the bottom of the shutter mechanism 10 to dispose a film in the aperture 11 which is in the focal plane of the camera.

The mechanism 10 may have a rectangular frame 12 having mounting flanges 13 for attachment to a camera frame. The upper and lower ends, with respect to Fig. 1, are boxed in with metal plates to house the motor driven rolls at end 14 and the spring urged driving rolls at end 16. A motor driving and shutter releasing mechanism may be disposed in a housing 17 to act upon one end of the rolls in box end 14. A pair of identical inertia brakes 18 are provided particularly in accordance with this disclosure to act on the other end of the same rolls in box end 14.

A shutter curtain 19 may be stretched between a motor driven roller 21 and a spring urged driving roller 22. The roller 22 may have an internal helical driving spring. The shutter curtain may have any type slit formed therein and there is illustrated a transparent plastic sheet 23. Idler rollers 24 may be provided to dispose the shutter curtain 19 as close to the aperture 11 as possible. The shutter curtain is illustrated as at the end of its exposure stroke, and it may be retracted by the motor mechanism 17 to position the slit adjacent to its roller 21 so that it will be cocked and ready for a new exposure stroke under the spring urging of roller 22.

A capping curtain 26 is normally rolled up on its spring urged driving roller 27 as illustrated and is connected by a pair of edge tapes 30, one of which is shown, to a motor driven roller 28. A pair of idler rollers 29 accurately position the capping curtain. When the shutter curtain has completed its exposure stroke as illustrated, the motor drive 17 acts on the capping roller 28 to wind up the edge tapes 30 to pull the capping curtain across the exposure aperture 11. When the aperture is fully covered the motor mechanism 17 acts on the shutter roller 21 to pull that curtain with its slit 23 back to its starting position with the slit 23 in the box end 14. The capping curtain 26 is then tripped and spring driving roller 27 snaps it quickly back to the position illustrated.

This return travel of the capping curtain 26, and the exposure travel of the shutter 19 are such rapid movements that large momentum forces are developed. If the spring driving rollers are suddenly stopped at the end of the travel, the curtains nevertheless continue moving, resulting in flapping and accidental exposure of the film. Also the forces of such a sudden stopping result in high mechanical stresses.

The placing of the brake mechanisms 18 on the "free" rollers causes the curtains and their spring driving rollers to be stopped by a strong drag. This tensions the curtains during the stopping movement, and positively prevents flapping. Further, high mechanical stresses are avoided.

The brakes 18 are shown in detail in Fig. 2 to Fig. 6 inclusive. Since the brakes are identical and act in the same manner for both the shutter curtain and the capping curtain, only one is shown and the capping curtain brake is illustrated. Referring to all of these figures, a flanged bushing member 31 may be secured to the outside of the frame 12 to support a rotatable shaft 32. The motor driven capping roller 28 is mounted on this shaft by means of a ball bearing assembly 33. A cylindrical brake housing 34 is secured over the flanged bushing 31 and an end cap 36 completes the enclosure for the brake mechanism.

The shaft 32 may have a key slot 32a, a collar 32b and a squared end as at 32c. A key 37 may drivingly connect the shaft 32 to the driving member 38 of an overrunning clutch, which member is generally circular and has notches formed therein to receive axially disposed rollers 39 urged toward the perimeter by compression spring and drive plunger assemblies 41. The clutch rollers 39 engage an internal surface of a cylindrical flange 42a on a driven clutch member 42.

The squared end 32c of the shaft may have a worm gear 43 mounted thereon which engages internal threads 44 of the roller 28. Since the gear 43 is free to move and does move axially on the squared end 32c, it is preferably referred to as a threaded shuttle. When the shaft 32 is not rotating, and the curtain roller 28 is rotating, the shuttle 43 does not rotate and the threaded engagement with the roller moves the shuttle one direction or the other depending on the direction of rotation of roller 28. When the shuttle reaches either end, it locks the shaft 32 to the roller 28 and thereafter the shaft 32 rotates.

To effect this locking of shaft and roller, a pin 46 is radially disposed in the roller to project into the roller threads 44 at their inner end. At the outer end a stop washer 47 (Fig. 4) is disposed having a radial lug that locks with the roller and projects into the threads 44. The shuttle 43 is specially shaped to engage these end stops 46 and 47 and is provided with a large radial driving face 43a on its inner end, whereas on the outer end the thread is merely cut off square as at 43b. The pin 46 strikes the large face 43a and initiates the braking action. The square cut 43b on the shuttle 43 may be struck by the washer 47 and merely rotates the shaft 32 and the clutch member 38 to cause the clutch to overrun and not engage.

The length of shuttle travel permits the capping curtain (or the shutter curtain) to make its travel under the urging of the spring driven rollers. After a precalculated travel, the shuttle 43 moves outwardly to be engaged by pin 46, causing shaft 32 to be locked to the roller 28 and the brake is thereupon brought into operation. In the present illustration the brake brings the roller 28 to rest from full speed in three quarters of one rotation.

The operation of the brake causes the angular acceleration of a rotatable mass 48 having stub shafts 49 and 51 journaled in the end plate 36 and in a recess in the shaft 32. The drive from shaft 32 to this mass 48 must be through an elastic, shock absorbing mechanism as well as through a step-up gearing since the energy absorbed is proportional to the square of the angular speed. Accordingly the driven clutch member 42 may have a squared hub 52 which is engaged by the square wound internal end 53a of a spiral strap spring 53. The outer end of spiral spring 53 is secured to a flange 54a of a planetary gear spider or frame 54. Mounted on axially projecting spindles of the spider 54 are a pair of planetary gears 56 which engage a sun gear 57 which is silver soldered or otherwise axially secured to the rotatable inertia mass 48. The planetary gears also engage the teeth of an internal ring gear 58 formed on the interior of the cylindrical housing 34. Thus the spiral spring 53 acts as a shock absorbing member, and the gears 58, 56 and 57 act as a step-up mechanism.

In the present case a 1 to 4 step-up in speed is desirable, placing a high shock load on the spiral spring 53. Accordingly, it is desirable to preload the spring 53 and this may be done by providing a projecting lug 42b on the driven clutch member 42 which lug can engage the flange 54a of the spider 54. The spring can be wound to the desired preload with the lug and flange out of alignment and then the preload can be held by placing them in alignment so that they can contact each other as illustrated in Fig. 2. Normally the lug 42b engages the flange 54a because of the preload but when the braking rotation is applied, the spring may be wound almost five-eighths of a turn before the mass 48 is accelerated sufficiently to correspond to the speed of the decelerated roller.

Since the length of travel of the shuttle is precisely calculated so that the full operation stroke of the curtains will take place and they will thereupon be stopped, it is important that the shaft 32 be held stationary during the travel of the shuttle. For this purpose a cylindrical helical spring 59 is employed to yieldingly connect the cylindrical housing 34 and the driving clutch member 38. A rotatable adjustment shell 61 may be placed inside the housing 34 adjacent to the bushing 31 and may have a projecting pin 61a to which one end of the spring 59 may be connected. The shell 61 may also have adjustment apertures 61b therein which are engaged by a screw 62 threaded in the housing 34. The other end of the spring 59 may be secured directly to the driving clutch member 38 but in the illustrated embodiment it is secured to the lug plate 63 having an apertured projecting lug 63a. The plate 63 may be riveted or otherwise secured to the driving clutch member 38.

The exact rotary rest position of the shaft 32 is determined by the lug plate 63 striking a projection 61c on the shell 61. The spring 59 is preloaded to give positive rotation of the lug 63a against the shell projection 61c. Inasmuch as the deceleration rotation of the roller 28 is less than a full turn, there will be no mechanical interference between lug and projection on the braking cycle. If braking rotation in excess of one full rotation is desired then a relatively stiff spring may be substituted for the spring 59 and the plate 63 may be eliminated, but such a spring should be weaker than the remaining torque of the springs in the drive rollers for the curtains. Such a stiff spring should be able to maintain the rest position of the shaft solely by means of its free rest condition. In any event, the cocking spring 59 or its equivalent unwinds when the curtain is retracted after completion of the braking operation.

Operation

In operation, the roller 28 is rotating in a direction to slide the shuttle gear 43 to the right in Fig. 2 on shaft 32. When the pin 46 strikes the flat face 43a of gear 43 shaft 32 is rotated because of the direct mechanical connection from pin 46 through gear 43 to the squared portion 42c of shaft 32. The shaft 32 rotates clutch member 38 in the direction of the arrow in Fig. 3, causing the clutch cylinders or rollers 39 to move toward the driven clutch flange 42a, to lock and bind the two members together. The driven clutch member 42 in turn winds the spiral spring 53 causing the planetary spider 54 to rotate. This causes the planetary gears 56 to rotate because of engagement with the internal gear 58 (Fig. 6) and thereby turn the mass gear 57, spinning the mass 48 to a high angular velocity. The acceleration of this mass 48 from a stationary condition to a high angular velocity absorbs the momentum of the curtain roller 28, the curtain, and the curtain drive roller.

The deceleration or braking effort may take place in the illustrated embodiment in about ¾ of a turn of the roller 28. The spiral shock absorber spring 53 is wound about five-eighths of a turn and sufficient energy is stored during this five-eighths turn to not only stop the roller 28, but to accelerate the weight 48 so that there will be no appreciated "kick back" torque applied to the roller 28. Relatively little energy is transmitted to the brake from the five-eighths turn to the three-fourths turn of the roller. Thus a careful design balancing must be achieved between spring strength and the inertia of the mass. In actual practice this may be handled by selective preloading of the spring 53. The spinning mass 48 is brought to rest primarily by the friction of the overrunning clutch 38—42 caused by the spring urged cylinders 39 being rubbed by the cylindrical flange 42a of the clutch member 42.

Modification

Referring to Figs. 7, 8, 9, and 10 there is illustrated a modified form of my invention wherein the clutch is disposed between the drive spring and the speed multiplying gearing. This construction reduces the shock loads upon the clutch to the extent that the mass of the spring member is eliminated together with part of the spring mass, with regard to the elements driven by the clutch rollers. Furthermore, the driving element for the clutch is a spring wihch tends to distribute or even out impact blows or loads from the drive shaft. This reduces impact stresses on the clutch and tends to prolong its life.

The modified brake may be designated by the numeral 65 and may include a bushing 66 supporting a shaft 67 and supporting a cylindrical brake housing 68 having an end cap 69. The shaft 67 may be keyed to a spring mount 71, illustrated particularly in Fig. 10. The inner end of a spiral spring 72 may be mounted on the element 71 and the outer end of the spring may be connected to the driving side 73 of an overrunning clutch.

The clutch may include spring biased rollers 74 that act on the inner surface of a cup shaped driven member 76 to which may be secured a spider 75 including a pair of projecting spindles 77. Planetary gears 78 may be mounted on the spindles 77 and may engage an internal ring gear 79 to drive a sun gear 81 directly connected to a rotatable mass 82 journaled in the end plate 69 and in a recess in the shaft 67.

Inasmuch as the same orientation function must be accomplished for the rotative rest position of the shaft 67 as in Fig. 2, a cylindrical helical spring 83 is provided having one end secured to a rotatable adjustment shell 84, the other end of which is connected to the spring mount element. The rotation adjustment positions a stop projection 84a at any selected point.

The stop for the main spring, which is preferably prestressed by several rotations may be the projecting tip of a lug 73a on the driving clutch member 73. The spring mount 71 may be provided with a pair of overlapping radial ears 71a and 71b to contact respectively the adjustable orientation stop 84 and the spring preload stop 73a. In Fig. 10 the spring mount 71 is shown reversed from its assembly position in Fig. 7, for purposes of clarity in disclosure of construction. The ear 71b always abuts against its projection 73a, because of the preload of spring 72. Spring 83 causes ear 71a to abut against projection 84a because of its weak preload, but the projection may be rotated to rotate shaft 67 to obtain the precise orientation for the squared outer end of shaft 67.

The operation of the modification of Figs. 7 through 10 is as follows. When a suitable mechanism rotates the shaft 67 for a braking movement, the prestressed spring 72 is rotated, transmitting a torque to the driving member 73 of the clutch. The clutch rollers 74 are thereupon wedged against the driven clutch member 76 causing it to rotate.

The attached spider 75 together with its spindles 77 also rotates causing the planetary gears 78 to rotate as they revolve. The engagement of the teeth of the planetaries with the internal gear 79 causes the rotation of the planetaries on their spindles and this in turn rotates the sun gear 81. This gear in turn is connected to the mass 82 which rotates. The gearing illustrated causes a 4 to 1 increase in speed of the mass 82 over the shaft 67 giving rise to rapid rotary acceleration which in turn absorbs the momentum of the mass that originally caused shaft 67 to rotate. The spinning mass is brought to rest by the friction of the spring pressed clutch rollers 74.

Upon completion of the braking action the shaft may be rotated back to its original position when the shutter mechanism is recocked. The shaft 67 will be held in a preselected angular position thereafter by the cylindrical helical spring 83 rotating the spring mount 71 until the radial ear 71a strikes the lug 84a on the adjustable shell 84. At the same time the projection 73a on the driven clutch member rests against the radial ear 71b to maintain the precompression in the shock absorbing spring 72.

While I have described my invention with respect to a preferred embodiment and one modification, I do not limit myself to mechanism illustrated or described, but include all modifications which fall within the true spirit and scope of my invention.

Different arrangements of parts are possible as exemplified by the modification of Figs. 7 through 10. The speed multiplying gearing reduces the weight of the mass required but direct coupling of the drive shaft and the mass could be employed. The spring need not be preloaded if sufficiently stiff, but preloading reduces shock loads and permits quicker braking by instantaneously storing energy which may be subsequently dissipated. The clutch permits overrunning of the mass to obtain deceleration over a longer period of time. Ratchet mechanisms could also be employed for this purpose.

From the foregoing it is obvious that any ratio of speed increase could be used. Any type of shock absorber spring could be employed, as well as any type of overrunning mechanism. The positioning stops are needed only for actuating mechanisms of the prescribed travel type as illustrated and different adjustments could be used. For these and other reasons, I do not limit myself to the disclosed embodiments nor do I otherwise limit myself.

I claim:

1. In a focal plane shutter having a roller of appreciable momentum rotatable about an axis, an inertia brake comprising: a brake shaft co-axial with said roller axis and mounted for rotation; a shuttle mechanism connecting one end of the brake shaft and said roller, whereby rotation of the brake shaft occurs after a predetermined angular movement of said roller; an inertia mass mouted for free rotation; a shock absorbing spring drivingly disposed between the other end of the brake shaft and the inertia mass; and an overrunning clutch drivingly disposed between the inertia mass and said other end of the brake shaft and connected to said shock absorbing spring, whereby said shuttle connects the brake shaft to the roller to drive the inertia mass through the clutch and the shock absorbing spring thereby absorbing the angular momentum of the roller so that the roller comes to rest without mechanical shock or kick back.

2. An inertia brake as defined in claim 1 wherein the shock absorbing spring is directly connected to said other end of the brake shaft and the spring in turn drives the overrunning clutch.

3. An inertia brake as defined in claim 1 wherein the overrunning clutch is directly connected to said other end of the brake shaft and drives in turn the shock absorbing spring.

4. In combination with a focal plane shutter having a roller of appreciable momentum rotatable about an axis, an inertia brake comprising: a brake shaft co-axial with said roller axis and mounted for rotation; a shuttle mechanism connecting one end of the brake shaft and said roller, whereby rotation of the brake shaft occurs after a predetermined angular movement of said roller; an inertia mass mounted for free rotation; a gear train mechanically driving the inertia mass and multiplying the rotations of a brake shaft applied to the gear train; and a coupling between said gear train and said other end of the brake shaft comprising an overrunning clutch and a shock absorbing spring connected together, whereby the inertia of the speed multiplied mass is first absorbed by the shock spring and the mass is then accelerated and the overrunning clutch permits free rotation of the mass after the accelerating torque is removed.

5. In a focal plane shutter, an inertia brake comprising: a cylindrical housing secured to the shutter; a brake shaft mounted for rotation on the cylindrical axis of the housing; an inertia mass mounted for rotation on an axis that is co-axial with the brake shaft; an internal ring gear secured to the interior of the housing adjacent the inertia mass; a sun gear mechanically connected to the inertia mass; a planetary spider mounted for rotation on the housing axis and having planetary gears approximately the same diameter as the sun gear and engaging said sun gear and ring gear; and a driving coupling between the planetary spider and the other end of said brake shaft and including an overrunning clutch and spiral strap spring for absorbing shock connected to said clutch; whereby rotation of the brake shaft drives the planetary spider through the clutch and spring to drive the inertia mass at a higher rotative speed, thereby absorbing torque applied to the shaft.

6. In a focal plane shutter having a frame and a roller rotatable about an axis, an inertia brake comprising: a cylindrical housing mounted on the shutter frame co-axially with the roller; a brake shaft rotatably mounted in the housing co-axially thereof and having one end projecting inside said roller; a shuttle mechanism interconnecting the shaft and the roller whereby the shaft is rotated after a predetermined angular movement of the roller; a helical spring connected to the shaft to maintain a normal shaft position while subject to shuttle friction; a spiral strap spring connected within the housing to the other end of said shaft for absorbing shock; an overrunning clutch connected within the housing to the shock spring and driven thereby; a planetary spider connected to the clutch and driven thereby; an inertia mass mounted for rotation within the housing co-axially with the brake shaft; and planetary gearing connecting the planetary spider and the inertia mass whereby the mass is rotated several times the rotative speed of the spider.

References Cited in the file of this patent
UNITED STATES PATENTS

| | | |
|---|---|---|
| 770,219 | Case | Sept. 13, 1904 |
| 778,660 | Hadden | Dec. 17, 1904 |
| 971,891 | Hoglund | Oct. 4, 1910 |
| 1,187,077 | MacCune | June 13, 1916 |
| 1,626,032 | Fairchild | Apr. 26, 1927 |
| 2,008,973 | Tuttle | July 23, 1935 |
| 2,037,360 | Barenyi | Apr. 14, 1936 |
| 2,092,064 | Hanna et al. | Sept. 7, 1937 |
| 2,206,144 | Wittel | June 2, 1940 |
| 2,298,340 | Bradford | Oct. 13, 1942 |
| 2,362,815 | Gorey et al. | Nov. 14, 1944 |
| 2,397,546 | Harris | Apr. 2, 1946 |

FOREIGN PATENTS

| | | |
|---|---|---|
| 13,980 | Great Britain | 1901 |
| 672,679 | France | Sept. 23, 1929 |
| 596,226 | Germany | Apr. 28, 1934 |